March 9, 1943. J. JANDASEK 2,313,645
TURBO TRANSMISSION
Filed May 24, 1940 2 Sheets-Sheet 1
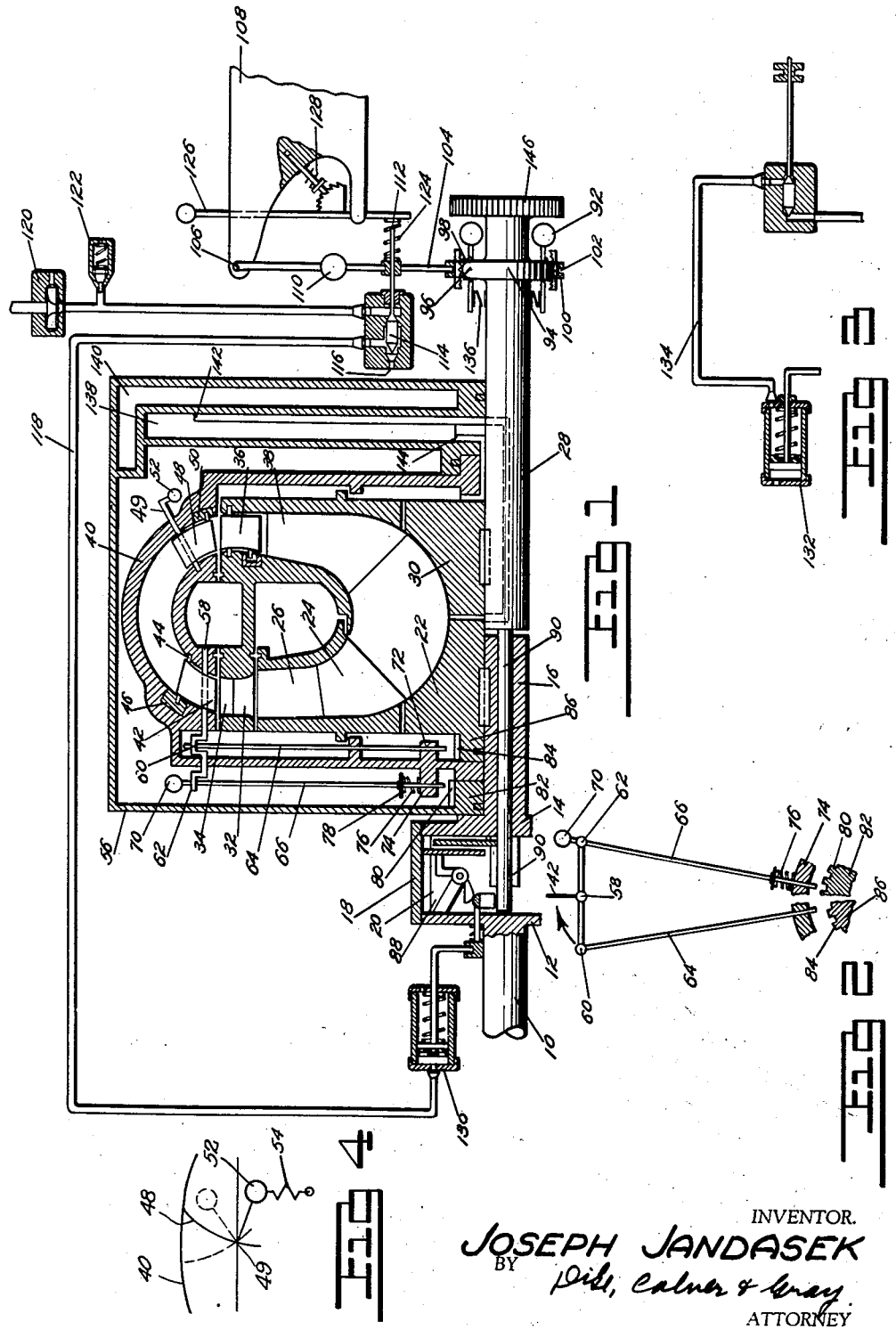
INVENTOR.
JOSEPH JANDASEK
BY
ATTORNEY March 9, 1943.   J. JANDASEK   2,313,645
TURBO TRANSMISSION
Filed May 24, 1940   2 Sheets-Sheet 2

INVENTOR.
JOSEPH JANDASEK
BY
ATTORNEY.

Patented Mar. 9, 1943

2,313,645

UNITED STATES PATENT OFFICE 2,313,645

TURBO TRANSMISSION

Joseph Jandasek, Detroit, Mich., assignor to Bendix Aviation Corporation, South Bend, Ind., a corporation of Delaware Application May 24, 1940, Serial No. 337,036

11 Claims. (Cl. 192—3.2)

This invention relates to a rotary apparatus for the transmission of power of the type comprising a passage for fluid including a pump impeller turbine runners and a guide wheel.

This invention provides a high speed rotary mechanism for the transmission of power by means of a fluid at varying speeds such that from any applied driving speed and torque a driven speed and torque are obtained of which the torque varies automatically as the load and speed varies inversely to the torque, the efficiency being high throughout the whole range of speeds, owing to infinite number of inclinations of the driving, driven and stationary vanes at all speeds and loads.

In order to improve the speed range, pivoted vanes for the blade wheels are employed. The vanes are automatically and continuously (not step by step) adjustable under the influence of the fluid. The blade wheels are also provided with a series of vanes; auxiliary vanes to rectify streamlines for the main vanes, to obtain orderly flow between the main vanes to reduce the number of the main vanes and to reduce the thickness of the main vanes. The best efficiency of the apparatus is when gearing ratio is about 1:1.

The main object of my invention is to maintain the efficiency of the torque converter constantly high, especially at high speeds, by continuously adjustable vanes and by means of inserted auxiliary rectifying vanes.

Another object of my invention is to provide a new combination of the fluid torque converter with a reverse gear and to provide a quick and positive method for shifting into "forward" or "reverse" by providing a shifting unit equipped with a turbo clutch mechanism.

To attain these and other objects, the impeller, the runner, and the guide wheel are provided with spring vanes made to turn on their pivots and so as to provide substantially correct entrance angles for every speed, the vanes being adjustably rotatable on their pivots by means of the fluid and by centrifugal force. I have used several sets of vanes of hydrofoil shape each set having its number, length, pitch, radial height, etc. correctly determined for the best efficiency and according to amount of deflection of fluid necessary in each particular set.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal section of a turbo transmission of a two-stage type;

Fig. 2 represents a vane operated clutch for the device;

Fig. 3 is a longitudinal sectional view of a modified form of controls for a direct drive clutch;

Fig. 4 is a diagrammatical view illustrating movements of vane;

Figure 5:
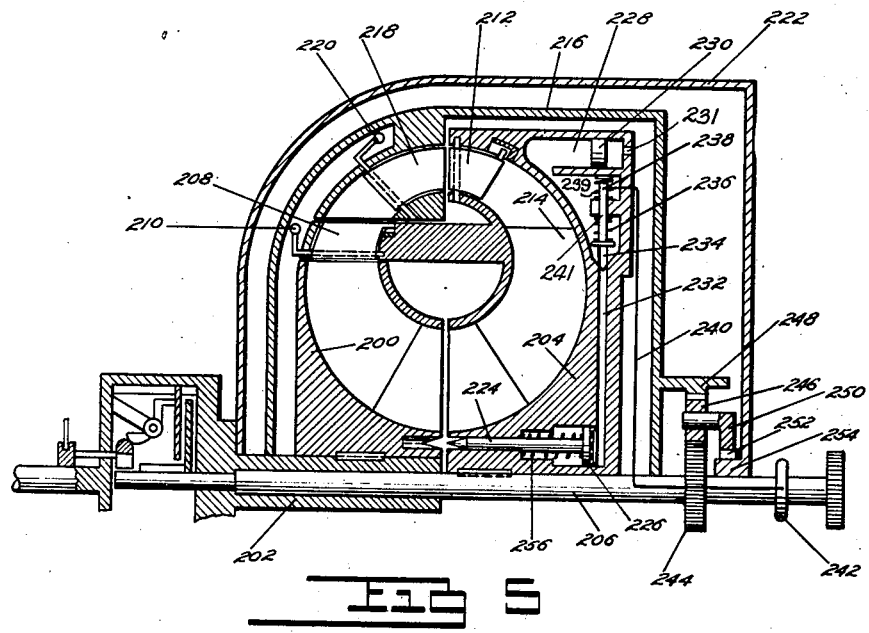
Fig. 5 shows another turbo with a two-speed guide wheel.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings for more specific details of the invention, Figs. 1, 2, 3 illustrate a turbo transmission particularly adapted for use with a motor vehicle having a power plant equipped with an intake manifold. The turbo transmission has a drive shaft 10 carrying a disc 12 connected to another disc 14 on a shaft 16 as by a cylindrical section 18 so as to provide a housing 20 intermediate the shafts. The shaft 16 is provided with primary means for energizing fluid. One desirable form of such fluid energizing means comprises a one-stage impeller 22 keyed to the shaft 16 has vanes 24 and 26 of substantially the same structure as disclosed in my co-pending application Serial No. 337,037, filed May 24, 1940.

A driven shaft 28 is provided with secondary means for absorbing energy from the fluid. One suitable form of energy absorbing means includes a two-stage turbine 30. The first stage is provided with vanes 32 and 34 and the second stage is provided with vanes 36 and 38 of similar structure to any one of the various types of vanes disclosed in my co-pending application hereinabove referred to. A rotatable guide wheel 40 supported on the shafts 16 and 28 has two sets of vanes including pivoted entrance vanes 42 of semifree type, limited in movement by stops 44. The vanes 42 are connected in series by a movable ring 46 and discharge vanes 48 connected in series by a movable ring 50 of substantially the type as disclosed in my co-pending application. Suitable balance weights 52 are provided for movement of the vanes 48 by centrifugal force due to high speed, into the position shown in dotted lines in Fig. 4 in which position the vanes function as driving vanes, while at lower speeds the vanes are moved on their shafts 49 into the position shown in full lines by suitable return springs 54 and function as guide vanes.

One or more of the entrance vanes 42 controls a connection between guide wheel 40 and a stationary housing 56. As shown, one of the vanes 42 is mounted on a shaft 58 carrying cranks 60 and 62 having thereon connecting rods 64 and 66, one of which, the rod 66, is weighted as at 70. The rods are loosely supported by guides 72 and 74, integral with guide wheel 40. A spring 76 interposed between the guide 74 and a collar 78 on the rod 66 normally holds the rod 66 from engagement with a slot 80 in a hub 82 on the stationary housing 56.

At low speeds and heavy loads, however, fluid will deflect vane 42 as shown diagrammatically in the direction of the arrow in Fig. 2. This moves the rod 66 into the slots 80 and results in connecting the guide wheel 42 to the stationary housing 56 so that the guide wheel may create reaction and increase the turning moment of fluid at heavy loads. At high speeds and light loads, when torque increase is not required, the vane 42 and the spring 76 overcome the friction and the rod 66 is withdrawn from slot 80 permitting the guide wheel to rotate freely. In this instance the apparatus functions as a single stage turbo clutch.

At still higher speeds, centrifugal force acting on the weight 70 on the rod 66 moves the rod 64 by means of cranks 60 and 62 into a slot 84 in a hub 86 on the impeller 22. This results in connecting the impeller and guide wheel rigidly together and, at the same time, the centrifugal force acting on the weight 52 turns the vanes 48 into position shown in full lines in Fig. 4, so that the guide wheel acts as an efficient impeller of much larger diameter than the original impeller 22. In this instance, the apparatus functions as a two-stage turbo clutch. The capacity of the apparatus is increased, circulation of fluid decreased, and consequently efficiency increased. Means may be provided for coupling and uncoupling the primary and secondary means. One desirable form of coupling operable at higher speeds includes a preselective servo clutch indicated generally at 88 is enclosed in the housing 20. This clutch connects the disc 14 on the impeller shaft 16 to an extension 90 on the shaft 28 to effect a direct drive. When so connected, the impeller, the runner, and the guide wheel rotate as a unit.

When the clutch 88 is engaged at a certain predetermined speed, centrifugal force acting on a weight 92 secured to an arm 94 on the turbine shaft 28 as by a pivot 96 having secured thereon a pinion 98 causes slight rotation of the pinion. This pinion meshes with a rack on a sleeve 100 and this results in shifting the sleeve. A circumferential groove 102 in the sleeve receives a lever 104 fulcrumed as at 106 on a fixed support 108 and provided with a weight 110. Accordingly, this shiftable movement of the sleeve is transmitted to the lever, and a rod 112 connects the lever to a double valve 114 for actuation by the lever.

This valve is provided with a relief port 116 and is connected in a fluid pressure delivery pipe 118 supplied from a suitable source of fluid under pressure, preferably by a pump 120 driven by an engine with a relief valve 122 interposed. The rod or stem 112 of the valve has thereon a spring 124 interposed between the lever 104 and a manually controlled lever 126 provided with suitable locking mechanism 128, and the fluid pressure delivery pipe 118 is connected to a fluid pressure actuated motor 130 for actuating the clutch 88.

Fluid from the source of supply flows through the valve 114 and pipe line 118 in the motor 130 resulting in energization of the motor with the consequent actuation of the clutch 88. This actuation of the clutch 88 locks the drive shaft 10 to the extension 90 on the turbine shaft 28, and thereafter, the impeller, the guide wheel, and turbine rotate as a unit.

It is apparent that the mechanism hereinabove described may be replaced by a vacuum operated system such as shown in Fig. 3. In the vacuum operated system, the fluid pressure actuated motor 130 is replaced by a vacuum actuated motor 132 connected as by a pipe line 134 through a valve corresponding to the valve 114 to the manifold of an engine, not shown.

The force of the spring 124 and, of course, the time of opening of the valve 114 is influenced automatically also by inertia of a weight 110 mounted on the lever 104. Mounting of the weight 110 should be such that the higher the acceleration of the motor vehicle, or the steeper the upgrade the vehicel may be ascending, the more tendency there is for the inertia of the pivoted weight 110 to close the valve 114. Consequently, the valve 114 opens only at higher than normal speeds; hence, direct drive can be effected at higher speeds only.

The speed of the vehicle at which direct drive is effected may be changed at will by the manually operated lever 126 to increase or decrease pressure of the spring 124. The greater the pressure of the spring 124, the lower the car speed must be when centrifugal force of the weight 92 overcomes the force of a return spring 136. Further, the greater the oil pressure, the less power of the governor 92 it takes to open the valve 114 and, consequently, shifting in direct drive occurs early at lower speeds and the vehicle is in direct drive at lower speeds.

A reserve and cooling tank 138, equipped with a cooling waterjacket 140 supplies fluid to the impeller through pipe 142 and hot fluid from transmission enters in the cooling tank as by an opening 144. Integral with the turbine shaft 28 is a transmission gear 146 and the rest of the gear transmission may be conventional, not shown.

It is of importance that efficient turbo clutch operation requires that the number and the angle of impeller entrance vanes be equal to the number and angle of turbine discharge vanes, and vice versa. Basically, Fig. 1 illustrates a hydraulic power transmission having a clutch connecting driving and driven element, the clutch being synchronized and actuated by power operated from the engine.

Fig. 5 illustrates a fluid device with an impeller 200 on a shaft 202, a two-stage turbine 204 on a shaft 206 has vanes 208 with balancing weight 210 for the first stage, and semifree vanes 212 and fixed vanes 214, a guide wheel 216 with vanes 218 balanced by weights 220, and a stationary housing 222.

The impeller and turbine may be connected or coupled pneumatically. As shown, plungers 224 actuated by fluid pressure motors 226 located in the wall of the turbine serves to lock the impeller and turbine together. The motor 226 is energized by air pressure created in a cylinder 228 by movement of a piston 230 in the cylinder due to pressure on the fluid introduced by centrifugal force through an orifice 231. The piston 230 floats between the air and the fluid. A passage 232 connects cylinders 228, and the passage 232 has therein a needle valve 234 urged to its seat by a spring 236, and a solenoid 238 for actuation of the valve. The solenoid 238 consists of an electrical coil 239 concentrically mounted on a stem 241 carried by the needle valve 234. When the coil 239 is energized it actuates the stem to remove the needle valve 234 from its seat. When the coil 239 is not energized the spring 236 urges the needle valve 234 to its seat. The valve 234 opens by means of centrifugal force. Electric current is delivered to the solenoid through a circuit 240 from a contact ring 242; necessary rheostat a manually actuated switch, etc. (not shown) may be conveniently located.

The turbine shaft 206 has a sun gear 244 in mesh with a planet gear 246 which, in turn, meshes with a ring gear 248 integral with the guide wheel 216. The planet gears 246 are rotatably mounted on a rotatable planet carrier 250; a one way clutch 252 mounted on a hub 254 of the housing 222 permits rotation of the planet carrier in the direction of turbine rotation, and inhibits its rotation in the opposite direction.

When starting the motor vehicle or at low speeds and heavy loads, the guide wheel 216 revolves in the reverse direction and its turning moment is transferred to the turbine shaft by the planet gears. At high speeds and light loads, the guide wheel has a tendency to rotate in the same direction as the turbine, which is provided for by the one way clutch.

Whenever the speed of the turbine 204 decreases, centrifugal pressure on the circulating fluid diminishes and consequently the air pressure decreases. As pressure on the fluid decreases, the air expands and moves the piston 230 to the right. This results in release of pressure on the fluid in the motor 226 and the springs 256 return the plungers 224 so as to uncouple the turbine from the impeller.

Figure 6:
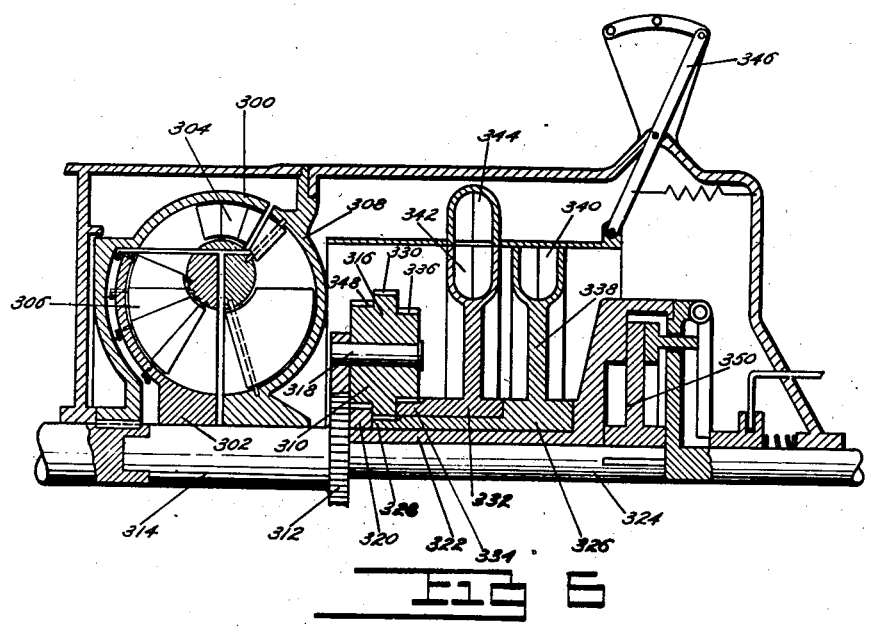
Fig. 6 is a longitudinal section through a turbo combined with a planetary gear transmission.

An embodiment of the invention illustrated in Fig. 6 relates to fluid turbine torque converters including an impeller 300 and a turbine 302, each provided with vanes pivoted near the entrance edge 304 and 306 respectively, so that the pivotal action of the vanes is restricted in the direction towards the following vane, but unrestricted in the opposite direction, and a guide wheel 308. This structure is operative to deliver variable forward speed.

To obtain reverse speed and emergency low forward speed, a conventional planetary gear transmission 310 is combined with the turbine transmission. This reduces the size of the turbine torque converter and increases its efficiency, for the apparatus may be designed for average working conditions and not for extreme conditions. A web 312 on the turbine shaft 314 serves as a carrier for a group of planet pinions 316, and the driving member has a series of lateral studs 318 which support the pinions. A driven gear 320 is rigidly secured to the hub of a clutch drum 322 which in turn is secured to a driven shaft 224.

The drum 322 has thereon a rotatable sleeve 326 supporting a sun gear 328 in mesh with a planet pinion 330, and a sleeve 232 rotatable on the sleeve 326 has a sun gear 334 in mesh with another planet gear 336. The sleeve 326 supports a disc 338 provided on its periphery with a section of a turbo clutch 340 and correspondingly, the sleeve 322 is provided on its periphery with a section of a turbo clutch 342. The sections of the turbo clutches 340 and 342 cooperate with a slidable section of a turbo clutch 344 for the purpose of shifting from neutral to low or reverse manually by the operating lever 346.

By engaging the clutch 344 with the clutch 342, the pinion 334 is substantially stalled and pinion 336 thereafter rolls on pinion 334 and pinion 348 of the group 316 turns gear 320 resulting in slowly turning the drum in the reverse direction. For direct drive, a friction clutch 350 locks the tail shaft 324 to the drum 322 and the entire gear mechanism rotates as a unit. This locking of the tail shaft to the drum is accomplished by an automatic governor such as illustrated in Fig. 1 and hereinabove described. In a similar way, by engaging the clutch 344 with the clutch 340 integral with pinion 328, the pinion 328 may be substantially stalled and thereafter planet pinion 330 rolls on the pinion 328 resulting in a low speed forward drive.

While this specification has been described in connection with certain specific embodiments, the principle involved is susceptible of numerous other applications that will readily occur to persons skilled in the art. The invention is, therefore, to be limited only as indicated by the scope of the appended claims.

This application is a continuation-in-part of my co-pending application entitled Turbine torque converter and clutch, filed February 23, 1935, Serial No. 7,896, which has eventuated in Patent No. 2,205,794, dated June 25, 1940.

Having thus described the various features of the invention, what I claim as new and desire to secure by Letters Patent is:

1. In an apparatus of the class described, the combination of a power plant, a fluid power transmission connected thereto including a primary means for energizing fluid, a secondary means for absorbing energy from the fluid, means for coupling the primary and the secondary means activated by a servo mechanism influenced by the secondary means and by pressure received from the intake manifold of the power plant.

2. In an apparatus of the class described, the combination of a vehicle having a power plant, a fluid power transmission connected thereto including a primary means for energizing fluid, a secondary means for absorbing energy from the fluid, means for coupling the primary and the secondary means activated by a servo mechanism influenced by the secondary means and also by pressure received from the intake manifold of the power plant, the servo mechanism being under the influence of inclination of the vehicle.

3. A fluid power transmission comprising primary means for energizing fluid, secondary means for absorbing energy from the fluid, a passage for circulating fluid provided by the primary and secondary means, means for coupling and uncoupling the primary and secondary means, fluid pressure means for influencing the coupling means, and means influenced by the speed of the secondary means for control of the fluid pressure means.

4. In an apparatus of the class described, the combination of a motor vehicle, a fluid power transmission including primary means for energizing fluid, secondary means for absorbing energy from the fluid and a passage for circulating fluid provided by the primary and secondary means, and means to couple the primary and secondary means activated by servo mechanism influenced by acceleration of the vehicle.

5. In an apparatus of the class described, the combination of a power plant and fluid pressure producing means associated therewith, a primary means for energizing fluid, a secondary means for absorbing energy from the fluid, means for synchronizing the primary and secondary means through torque developed by the power plant, transmitted to the primary means and measured by the pressure on the fluid developed by the pressure producing means.

6. A fluid power transmission comprising primary means for energizing fluid, secondary means for absorbing energy from the fluid, guide means for the fluid, and mechanism connected to the guide means operative by fluid flow reaction for synchronizing the guide means with the primary means.

7. A fluid power transmission comprising a passage for circulation of fluid, a driving vane wheel, a driven vane wheel, a guide vane wheel, mechanism for coupling the guide vane wheel to the driven vane wheel automatically under control of the centrifugal force of the speed of the guide wheel.

8. A fluid power transmission comprising a housing, a passage for circulation of fluid, rotatable driving, driven and guide vane wheels in the housing, and means for locking the guide vane wheel in both directions to the housing at low speed to one of the vane wheels at high speed automatically under control of operative speeds of the guide vanes.

9. A fluid power transmission comprising a casing, driving, driven and guide blade wheels arranged within the casing for cooperation with one another, a heavy and a light fluid within the casing, means for locking two of the blade wheels together activated by the light fluid automatically under control of the speed of one of the blade wheels while in operation.

10. A fluid power transmission comprising a casing, driving, driven and guide blade wheels arranged within the casing for cooperation with one another, a light fluid and a heavy fluid within the casing, means for locking two of the blade wheels together activated by the light fluid automatically under control of the speed of one of the blade wheels while in operation, the lighter fluid being energized by the heavier fluid at a predetermined speed.

11. In an apparatus of the class described in combination with a power plant having a pump for producing pressure, a passage for the circulation of fluid, primary means for energization of the fluid, secondary means driven by the fluid, means for coupling the primary and secondary means and fluid pressure activated means utilizing the pressure developed by the pump for control of the coupling means automatically.

JOSEPH JANDASEK.